S. MAY.
SAUSAGE CASING AND METHOD OF MAKING THE SAME.
APPLICATION FILED SEPT. 21, 1912.
1,063,714.
Patented June 3, 1913.
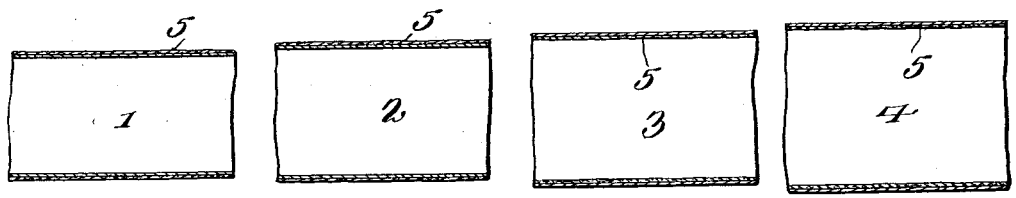
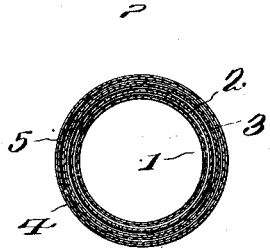
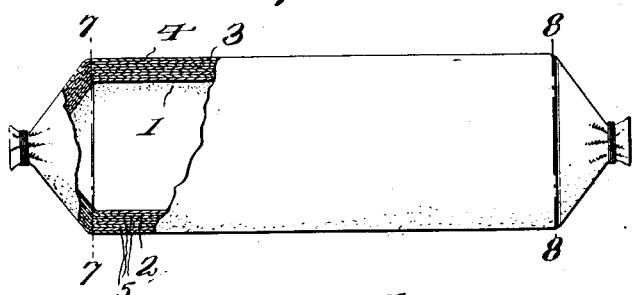
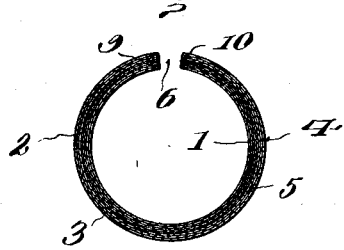
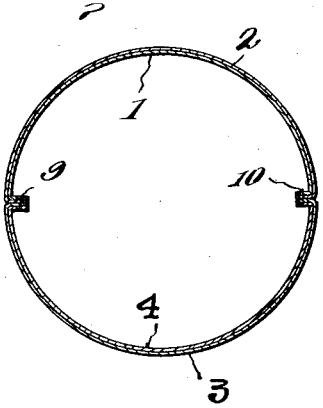
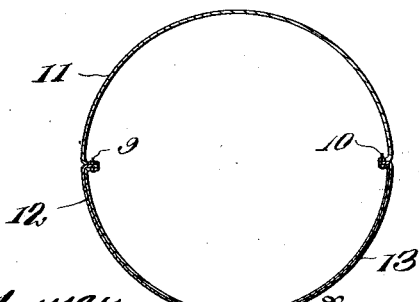
Witnesses
Inventor
Solomon May
By Sturtevant & Mason
Attorneys

UNITED STATES PATENT OFFICE.

SOLOMON MAY, OF CHICAGO, ILLINOIS.

SAUSAGE-CASING AND METHOD OF MAKING THE SAME.

1,063,714.  Specification of Letters Patent.  Patented June 3, 1913.

Application filed September 21, 1912. Serial No. 721,570.

*To all whom it may concern:*

Be it known that I, SOLOMON MAY, a citizen of the United States, residing at Chicago, in the county of Cook and State of Illinois, have invented certain new and useful Improvements in Sausage-Casings and Methods of Making the Same, of which the following is a description, reference being had to the accompanying drawing and to the figures of reference marked thereon.

The invention relates to new and useful improvements in sausage casings and the method of making the same, and more particularly to sausage casings which are made from animal intestines.

An object of the invention is to provide a method of making sausage casings of the above character, wherein the poorer quality of intestines which have heretofore been discarded may be utilized for forming the casings.

A further object of the invention is to provide a method of forming the casings of the above character, wherein the resulting casing is of greater sectional capacity than the intestines from which the same is made.

A further object of the invention is to provide a sausage casing made from animal intestines wherein the walls of the casing are strengthened by the use of a plurality of layers or sections of intestines, so that said casing may be strong and durable.

These and other objects will in part be obvious, and will in part be hereinafter more fully described.

In the drawings,—Figure 1 represents several sections of intestines positioned for insertion one within the other; Fig. 2 is a transverse section showing the sections assembled one within the other; Fig. 3 is a partial longitudinal section showing the sections of the intestines distended so as to bring the surfaces into contact; Fig. 4 is a view showing the sections cut longitudinally and the superposed edges along each longitudinal edge stitched; Fig. 5 is a view showing the sections separated and the casing turned so as to bring the stitched edges within the casing; and Fig. 6 is a view similar to Fig. 5, showing a slightly modified form of the invention.

The primary object of the present invention is to provide a method whereby the intestines which are small and of poor quality may be utilized for forming sausage casings. This is accomplished by utilizing two or more layers of such intestines for building up the wall of the casing.

In carrying out the invention, I take four sections of intestines 1, 2, 3 and 4, as illustrated in Fig. 1. The section 1 as illustrated, is turned so as to bring the inner surface 5, which is more or less slimy, to its outer face. The section 2 is also shown as turned. The sections 3 and 4 are not turned. These sections are inserted one within the other, so that section 1 is within section 2; sections 1 and 2 are within section 3; and sections 1, 2 and 3 are within section 4. After these sections have been inserted one within the other, the ends are preferably tied, and the same distended by the use of air or the like, so that the adjacent surfaces of the intestines are forced into contact with one another. While held in this condition, the sections of intestines are dried until said surfaces which are in contact adhere. The casing is then cut longitudinally as at 6, and the ends may also be cut on the lines 7—7 and 8—8, if desired.

The superposed edges are stitched or otherwise secured along each side of the cut, as indicated at 9 and 10, Fig. 4. The two inner sections 2 and 3 are then separated, and the casing turned inside out, as shown in Fig. 5. The resulting casing is of much greater sectional area than the sections of the intestines. Furthermore, each wall of the finished casing is formed of two layers of material, which greatly strengthens the finished casing. The adjacent walls of the sections 3 and 4, and also of the sections 1 and 2 will remain adhering to one another.

While I have described certain of the sections as being turned inside out, so as to bring in the finished casing, the natural inner surfaces to the outer face of the casing, it is obvious from certain aspects of the invention that it is not essential that the sections shall be turned inside out, or placed together in the order above stated. As a matter of fact, when two surfaces of intestines, whether the natural inner or outer surfaces, are placed in contact and dried, they will adhere to each other. Furthermore, while I have described the sections as being first cut and then stitched along each longitudinal edge, it is obvious that said sections may be simultaneously cut and stitched or stitched before cutting.

In Fig. 6 I have shown a slightly modified form of my invention, wherein only one section of the wall of the casing is reinforced or made of two layers of material. By my improved method I may use the intestines which are poor in quality with the intestines which are of better quality. In order to do this, the sections of the intestines which are poor in quality may be inserted within each other and within the section which is of better quality, the three sections then distended until they adhere, after which the sections are cut and stitched; then the surface of the better quality of intestine is separated from the surface of the other sections of the intestines and the casing turned so as to bring the stitches to the inner side of the casing.

In Fig. 6 I have illustrated a casing made as above noted, and in this figure the section 11 indicates the intestine of a better grade, while the sections 12 and 13 are the intestines of a poorer quality.

It is obvious that minor changes in the steps of my improved method, and in the construction of the article described, may be made without departing from the spirit of the invention as set forth in the appended claims.

Having thus described my invention, what I claim as new and desire to secure by Letters Patent, is:—

1. The herein described method of making sausage casings, consisting in placing three or more sections of intestines one within another, distending the sections until the surfaces are in contact, drying said sections until the same adhere, cutting the sections longitudinally, securing the superposed edges of the sections along each longitudinal edge, and separating the adjacent faces of two of the sections.

2. The herein described method of making sausage casings, consisting in placing three or more sections of intestines one within another, distending the sections until the surfaces are in contact, drying said sections until the same adhere, cutting the sections longitudinally, stitching the superposed edges of the sections along each longitudinal edge, and separating the adjacent faces of two of the sections and turning the casing so as to bring the stitched edges inside the casing.

3. The herein described method of making sausage casings, consisting in placing four sections of intestines one within another with the natural inner faces of the two inner sections on the outside thereof, and with the natural inner faces of the two outer sections on the inside thereof, distending the sections until the adjacent surfaces are in contact, drying until said sections adhere, cutting the sections longitudinally and stitching along each longitudinal edge, separating the two inner sections from the two outer sections, and turning the casing so that the natural inner faces of the intestines form the outer face of said casing.

4. A sausage casing comprising a plurality of sections of intestines stitched together at each longitudinal edge, certain of said sections being formed by two or more layers of the intestines.

5. A sausage casing comprising a plurality of complete sections of intestines split longitudinally and stitched together along each longitudinal edge, the natural inner faces of said intestines forming the outer face of said casing.

In testimony whereof, I affix my signature in the presence of two witnesses.

SOLOMON MAY.

Witnesses:
ANNIE C. COURTENAY,
GEO. L. WILKINSON.